(12) United States Patent
North et al.

(10) Patent No.: US 6,546,733 B2
(45) Date of Patent: Apr. 15, 2003

(54) METHODS AND SYSTEMS FOR COOLING GAS TURBINE ENGINE COMBUSTORS

(75) Inventors: Gary Lee North, Cincinnati, OH (US); Willard James Dodds, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 09/893,536

(22) Filed: Jun. 28, 2001

(65) Prior Publication Data

US 2003/0000217 A1 Jan. 2, 2003

(51) Int. Cl.[7] ............... F23R 3/10; F23R 3/12
(52) U.S. Cl. ............... 60/772; 60/740; 60/748; 60/756
(58) Field of Search .......... 60/772, 748, 737, 60/752, 756, 754, 740

(56) References Cited

U.S. PATENT DOCUMENTS

| | | | | |
|---|---|---|---|---|
| 3,831,854 A | * | 8/1974 | Sato et al. | 60/756 |
| 3,916,619 A | * | 11/1975 | Masai et al. | 60/756 |
| 4,085,581 A | * | 4/1978 | Caruel et al. | 60/738 |
| 4,162,611 A | * | 7/1979 | Caruel et al. | 431/352 |
| 4,322,945 A | * | 4/1982 | Peterson et al. | 60/740 |
| 5,117,637 A | | 6/1992 | Howell et al. | |
| 5,142,871 A | * | 9/1992 | Lampes et al. | 60/756 |
| 5,253,471 A | * | 10/1993 | Richardson | 60/754 |
| 5,291,732 A | | 3/1994 | Halila | |
| 5,329,761 A | * | 7/1994 | Ablett et al. | 60/746 |
| 5,509,270 A | * | 4/1996 | Pearce et al. | 60/740 |
| 5,623,827 A | * | 4/1997 | Monty | 60/747 |
| 5,630,319 A | | 5/1997 | Schilling et al. | |
| 5,894,732 A | * | 4/1999 | Kwan | 60/748 |
| 5,941,076 A | * | 8/1999 | Sandelis | 60/752 |
| 5,956,955 A | * | 9/1999 | Schmid | 60/748 |
| 6,082,113 A | | 7/2000 | Prociw et al. | |

* cited by examiner

Primary Examiner—Ted Kim
(74) Attorney, Agent, or Firm—Rodney M. Young; Armstrong Teasdale LLP; Robert B. Reeser, III

(57) ABSTRACT

A combustor for a gas turbine includes a dome assembly that facilitates extending a useful life of the combustor in a cost-effective and reliable manner. The dome assembly includes a dome plate and a heat shield coupled to the dome plate. The dome plate includes an impingement baffle and an opening extending therethrough and sized to receive a fuel injector. The impingement baffle also includes a plurality of cooling openings in flow communication with the heat shield that direct cooling airflow for impingement cooling and film cooling of the heat shield.

20 Claims, 3 Drawing Sheets

METHODS AND SYSTEMS FOR COOLING GAS TURBINE ENGINE COMBUSTORS

STATEMENT REGARDING FEDERALLY SPONSORED RESEARCH & DEVELOPMENT

This invention was made with Government support under Contract Nos. DAAH10-98-C-0023, awarded by the Department of the Army, and F33615-98-C-2803, awarded by the Department of the Air Force. The Government has certain rights in this invention.

BACKGROUND OF THE INVENTION

This invention relates generally to gas turbine engines, and more specifically to heat shields used with gas turbine engine combustors.

A gas turbine engine typically includes a core engine having a serial flow arrangement, a high pressure compressor which compresses airflow entering the engine, and a combustor which burns a mixture of fuel and air. The combustor consists of a dome assembly at a forward end of the combustor, and liners, which contain the hot products of combustion and direct them toward the turbine. The fuel injector is aligned with holes in the combustor dome that are specifically designed to mix incoming fuel with air at a proper ratio for burning. Since the products of combustion may exceed the thermal capabilities of any metal parts, the products of combustion are prevented from directly contacting structural metal parts. To facilitate insulating structural components from the products of combustion, at least some known combustor dome assemblies include a structural dome plate that provides support to the liners, and a heat shield that insulates the structural elements from the hot products of combustion.

Cooling air is supplied to surfaces of structural elements that are exposed to the higher temperature combustion gases. More specifically, in at least some known combustor dome assemblies, the dome plate includes impingement cooled heat shields which are cooled as cooling air is accelerated through small holes in the dome to impinge on a forward surface of the heat shield. After impinging on the heat shield forward surface, the cooling air enters the combustor around the edges of the heat shields. However, cooling air is needed in many parts of the engine, and in at least some known advanced high pressure ratio engines, the need for cooling air may begin to exceed supply. As a result, continued exposure to high temperatures by an aft surface of the heat shields may decrease the useful life of combustor assemblies that include domes.

BRIEF SUMMARY OF THE INVENTION

In one aspect of the present invention, a combustor for a gas turbine including a dome assembly that facilitates extending a useful life of the combustor in a cost-effective and reliable manner is facilitated. The dome assembly includes a dome plate and a heat shield coupled to the dome plate. The dome plate includes an impingement baffle and an opening extending therethrough for receiving a fuel injector. The impingement baffle also includes a plurality of cooling openings that extend therethrough and are in flow communication with the heat shield.

In another aspect, a combustor for a gas turbine engine is provided that includes a dome assembly including a dome plate and a heat shield coupled to said dome plate. The dome plate includes an impingement baffle and a fuel injector opening that extends therethrough. The impingement baffle is configured to direct air for impingement cooling and film cooling of said heat shield.

In a further aspect of the invention, a method for supplying airflow to a gas turbine engine combustor through a dome assembly is provided. The dome assembly includes a dome plate and a heat shield. The dome plate includes an impingement baffle, and the heat shield is coupled to the dome plate. The method includes the steps of directing compressed airflow to the impingement baffle, and redirecting airflow towards the heat shield with the impingement baffle for impingement cooling and film cooling of the heat shield.

DETAILED DESCRIPTION OF THE INVENTION

Figure 1:
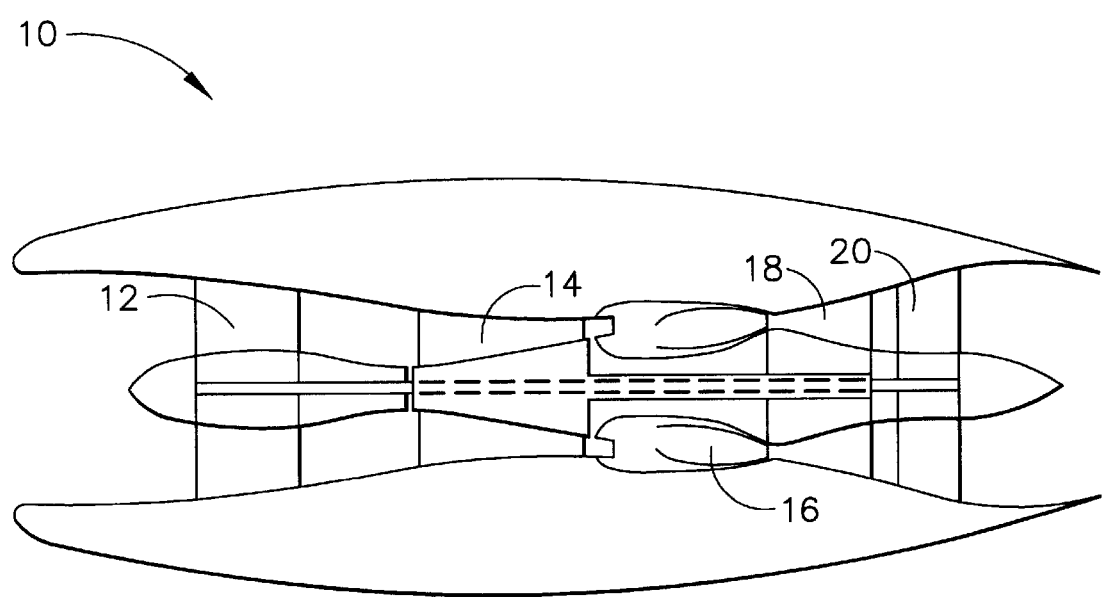
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20.

Figure 2:
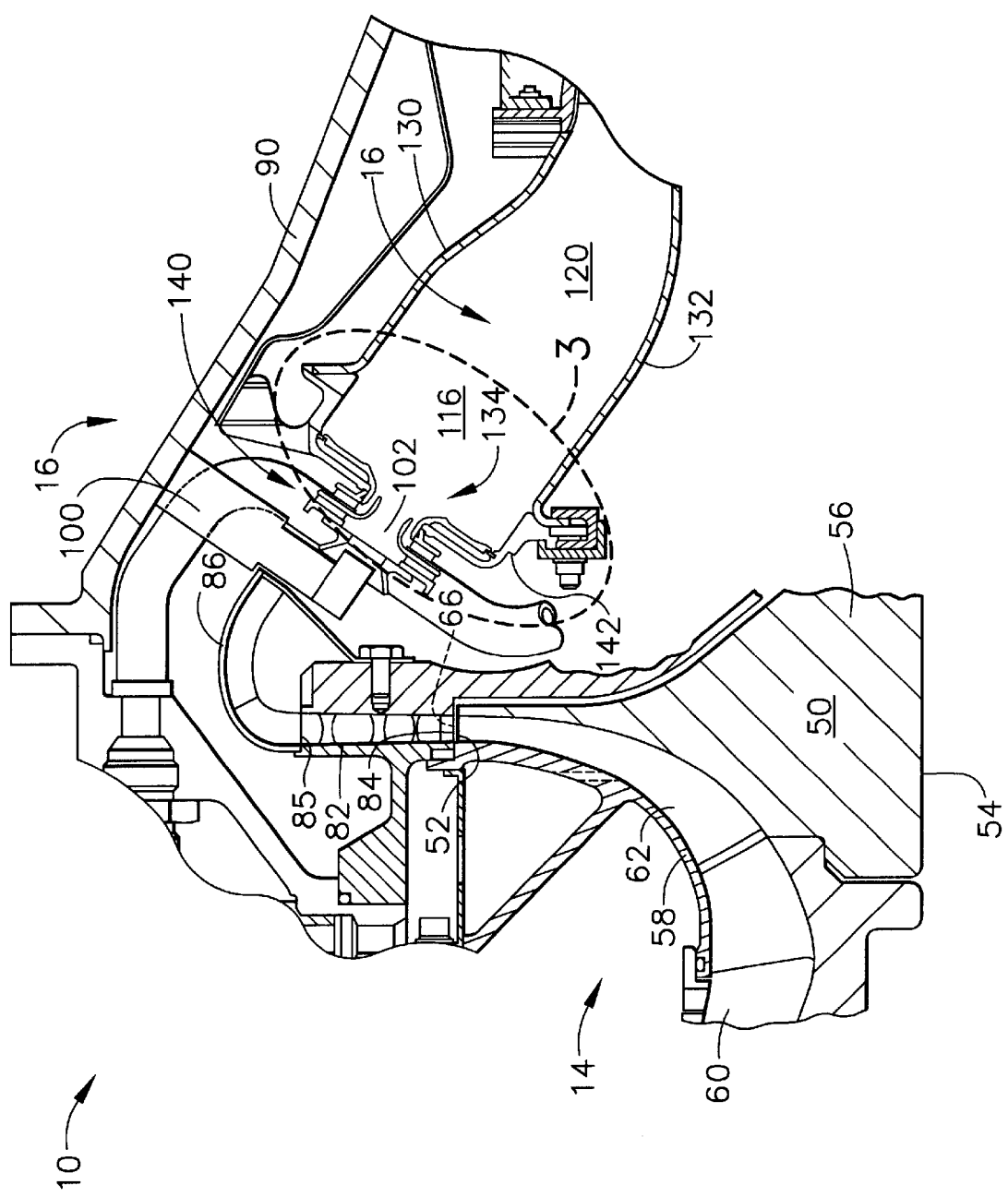
FIG. 2 is a side cross-sectional schematic illustration of a combustor used with the gas turbine engine shown in FIG. 1.
Figure 3:
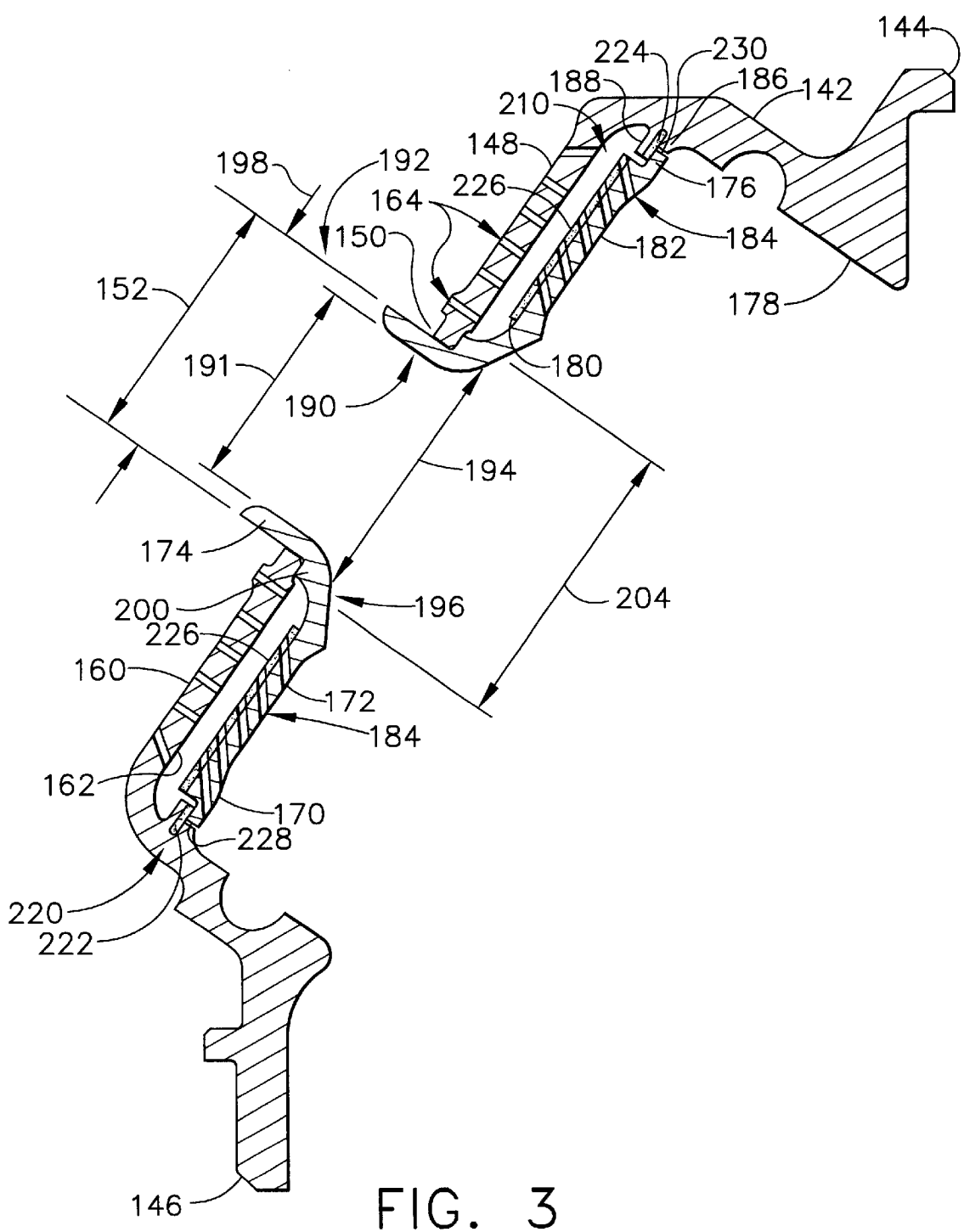
FIG. 3 is an enlarged view of the combustor shown in FIG. 2 taken along area 3.

FIG. 2 is a side cross-sectional schematic illustration of combustor 16 for gas turbine engine 10. In one embodiment, the gas turbine engine is a T700 available from General Electric Company, Cincinnati, Ohio. FIG. 3 is an enlarged view of combustor 16 taken along area 3. Combustor 16 is downstream from compressor 14.

Compressor 14 includes a plurality of blades (not shown) and a centrifugal compressor, or impeller 50. Centrifugal compressor 50 extends afterward from compressor 14 downstream of the blades and includes an exit 52, a hub 54, and a rotating impeller body 56 extending therebetween. Centrifugal compressor 50 also includes a non-rotating impeller shroud 58. In one embodiment, impeller 50 is a single stage centrifugal impeller.

Impeller body 56 and impeller shroud 58 extend radially outward from an inlet 60 to exit 52 in a frusto-conical shape and includes a chamber 62 and a discharge opening 66 in flow communication with chamber 62. Impeller hub 54 is coupled circumferentially to a rotor shaft (not shown). Discharge opening 66 is adjacent impeller exit 52 and permits impeller chamber 62 to be in flow communication with a diffuser 82. Diffuser 82 is positioned radially outward from centrifugal compressor 50 and includes an inlet 84 and an outlet 85. Inlet 84 is adjacent impeller discharge opening 66 and inlet air to exit impeller 50 serially into diffuser 82. A deswirl cascade 86 is in flow communication with diffuser 82 and extends from diffuser outlet 85.

Combustor 16 is positioned downstream from centrifugal compressor 50 and includes a casing 90. A plurality of fasteners (not shown) secure combustor 16 within engine 10. Combustor 16 includes a plurality of fuel nozzles 100 which inject fuel into an inlet side 102 of combustor 16. Combustor 16 includes an annular combustion chamber 116 extending from inlet side 102 of combustor 16 to an outlet side 120 of combustor 16. Combustor outlet side 120 is positioned adjacent a high pressure turbine nozzle (not shown).

Combustor 16 includes an annular outer liner 130, an annular inner liner 132, and a domed end 134 extending between outer and inner liners 130 and 132, respectively. Outer liner 130 is spaced radially inward from combustor casing 90 and with inner liner 132 defines annular combustion chamber 116. In the exemplary embodiment, combustor domed end 134 includes an annular dome 140 arranged in a single annular configuration. In one embodiment, combustor domed end 134 includes a plurality of domes 140 arranged in a double annular configuration. In a second embodiment, combustor domed end 134 includes a plurality of domes 140 arranged in a triple annular configuration.

Dome 140 includes a dome plate 142 having an outer end 144 fixedly attached to combustor outer liner 130 and an inner end 146 fixedly attached to combustor inner liner 132. Dome plate 142 includes an impingement baffle 148 that extends across combustor inlet side 102 and defines a center opening 150 extending through dome plate 142. Dome plate opening 150 has a diameter 152 that is sized to receive fuel nozzle 100 and a swirler assembly (not shown) therethrough. Impingement baffle 148 includes an outer surface 160, an inner surface 162, and a plurality of cooling openings 164 extending therebetween. Cooling openings 164 accelerate the cooling air and direct the cooling air towards a heat shield 170. Cooling openings 164 extend circumferentially around dome plate opening 150, and around an annulus of combustor dome 140.

Heat shield 170 is coupled to dome plate 142 and extends through dome plate opening 150. Heat shield 170 includes a first body portion 172 and a second body portion 174. First body portion 172 extends from an outer edge 176 coupled to dome plate 142, to heat shield second body portion 174. More specifically, first portion radially outer side is coupled to an inner surface 178 of dome plate 142.

Heat shield first body portion 172 includes an outer surface 180, an inner surface 182, and a plurality of openings 184 extending therebetween. A series of raised bumps (not shown) extend outwardly from outer surface 180 to facilitate enhancing a cooling capability of the impingement cooling air by increasing a surface area of surface 180. Openings 184 are extend at an angle through heat shield first body portion 172 with respect to inner surface 182 and outer surface 180 to facilitate providing additional cooling surface area contact between the cooling air and heat shield 170. Openings 184 are in flow communication with impingement baffle cooling openings 164. First body portion 172 is substantially parallel to dome plate impingement baffle 148, and accordingly, first body portion 172 is in flow communication with impingement baffle cooling openings 164. More specifically, heat shield first body portion 172 includes a mounting projection 186 that extends outwardly from heat shield outer edge 176. Mounting projection 186 contacts a shoulder 188 extending radially inwardly from dome plate inner surface 178 to couple heat shield first body portion 172 to dome plate 142.

Heat shield second body portion 174 extends convergently from heat shield first body portion 172 and defines an opening 190 extending through heat shield 170. Opening 190 is sized to receive fuel nozzle 100 and the swirler assemblies therethrough, and accordingly because heat shield body portion 174 is convergent, an inner diameter 191 of heat shield opening 190 at an upstream side 192 of heat shield 170 is smaller than an inner diameter 194 of heat shield opening 190 at a downstream side 196 of heat shield opening 190. Furthermore, heat shield second body portion 174 extends through dome plate opening 150, such that heat shield opening 190 is co-axially aligned with respect to dome plate opening 150. Cooling openings 184 are further arranged in a circular pattern to reinforce the swirl of fuel and air passing through heat shield opening 190 to facilitate improving a film cooling effectiveness. An outer diameter 198 of heat shield opening 190 measured with respect to heat shield outer surface 180 is slightly smaller than dome plate opening diameter 152.

Heat shield second body portion 174 includes an annular shoulder 200 that limits a distance 202 that heat shield second body portion 174 extends through dome plate opening 150. Accordingly, second body portion shoulder 200 has an outer diameter 204 that is larger than dome plate opening diameter 152. Furthermore, the combination of heat shield first body portion mounting projection 186 and heat shield second body portion shoulder 200 ensure that heat shield 170 is maintained in alignment with respect to dome 140. More specifically, projection 186 and shoulder 200 ensure that heat shield 170 is coupled to dome plate 142 such that a cavity 210 is defined between heat shield 170 and dome plate 142.

Cavity 210 extends annularly around heat shield second body portion 174 between dome plate impingement baffle 148 and heat shield first body portion 172. More specifically, cavity 210 is defined between impingement baffle inner surface 162 and heat shield outer surface 180. Accordingly, heat shield first body portion openings 184 and impingement baffle cooling openings 164 are in flow communication with cavity 210.

A seal assembly 220 extends between heat shield 170 and dome plate 142 to facilitate preventing airflow entering cavity 210 from flowing through an interface between heat shield 170 and dome plate 142. More specifically, seal assembly 220 includes an inner seal 222, an outer seal 224, and a radial seal 226. Inner seal 222 extends along a radially inner side 228 of heat shield 170 between dome plate 142 and heat shield mounting projection 186. Outer seal 224 extends along a radially outer side of heat shield 170 between dome plate 142 and heat shield mounting projection 186. Radial seal 226 extends along heat shield first body portion 172 between heat shield radially inner and outer sides 228 and 230, respectively, to facilitate sealing between adjacent heat shield openings 184. In an alternative embodiment, dome 140 does not include seal assembly 220 and uses tight clearance control between heat shield 170 and dome plate 142 to facilitate preventing airflow entering cavity 210 from flowing between heat shield 170 and dome plate 142.

During operation, compressed airflow exits compressor 14 and is directed for cooling of combustor 16. More specifically, compressed airflow is directed towards dome 140 and used for impingement cooling of dome plate 142. The airflow strikes impingement baffle 148 and is directed through impingement baffle cooling openings 164 into cavity 210 for impingement cooling of heat shield 170. Accordingly, airflow striking impingement baffle 148 functions as a heat sink to reduce an operating temperature of dome plate 142.

The airflow is then channeled through impingement baffle openings 164 and into cavity 210. Seal assembly 220 prevents the compressed air from flowing between an interface of dome plate 142 and heat shield 170 formed between dome plate inner surface 162 and heat shield first body portion 172. As a result, airflow entering cavity 210 is intermediary in pressure between that upstream of impingement baffle openings 164, and that in combustion chamber 116 and downstream of heat shield cooling openings 184. Accordingly, the air flowing through heat shield openings 184 functions as a heat sink to reduce an operating temperature of heat shield 170. Additionally, because cavity 210 is at a higher pressure than combustion chamber 116, hot gas is prevented from flowing backwards through heat shield openings 184. Rather, airflow exiting heat shield openings 184 provides film cooling of heat shield inner surface 178.

The above-described combustor is cost-effective and highly reliable. The combustor includes a heat shield coupled to a dome plate such that a cavity is formed therebetween. The heat shield cooling openings are in flow communication with the dome plate impingement baffle openings and the cavity defined therebetween. Airflow entering the cavity is used for impingement cooling of the dome plate and the heat shield. Airflow exiting the cavity through the heat shield openings is used for film cooling the heat shield. As a result, the operating temperature of the heat shield and the dome plate is reduced, thus facilitating extending a useful life of the combustor dome in a cost-effective and reliable manner.

While the invention has been described in terms of various specific embodiments, those skilled in the art will recognize that the invention can be practiced with modification within the spirit and scope of the claims.

What is claimed is:

1. A method for supplying airflow to a gas turbine engine combustor through a dome assembly, the dome assembly including a dome plate and a heat shield, the dome plate including an impingement baffle, the heat shield coupled to the dome plate, said method comprising the steps of:

directing compressed airflow to the impingement baffle;

redirecting airflow towards the heat shield with the impingement baffle for impingement cooling and such that a portion of the air flow is channeled to an opposite side of the heat shield for film cooling of the heat shield; and using a seal assembly to prevent airflow from leaking between the heat shield and the dome plate, wherein the seal assembly extends radially outwardly from a radially outer edge of the heat shield to the dome plate.

2. A method in accordance with claim 1 wherein the impingement baffle includes a plurality of openings extending therethrough, said step of redirecting a portion of the airflow further comprises the step of channeling airflow through the impingement baffle openings towards the heat shield.

3. A method in accordance with claim 1 further comprising the step of redirecting airflow with the heat shield for film cooling the heat shield.

4. A method in accordance with claim 3 wherein the heat shield includes a plurality of openings extending therethrough, said step of redirecting airflow with the heat shield further comprises the steps of:

redirecting airflow through the heat shield openings for film cooling the heat shield; and redirecting airflow through the heat shield openings to reinforce swirling airflow within a combustion chamber.

5. A method in accordance with claim 1 wherein said step of using a seal assembly further comprises the step of using a seal assembly that extends circumferentially between the heat shield and the dome plate to prevent airflow from leaking between the heat shield and the dome plate.

6. A method in accordance with claim 1 wherein the heat shield and the dome plate define a cavity, said step of redirecting airflow towards the heat shield with the impingement baffle further comprising the step of directing airflow into the cavity defined between the heat shield and the impingement baffle.

7. A dome assembly for a gas turbine engine combustor, said dome assembly comprising:

a dome plate comprising an impingement baffle and an opening extending therethrough and sized to receive a fuel injector;

a heat shield extending through said dome plate opening and coupling to said dome plate, said impingement baffle configured to direct air for impingement cooling, said heat shield configured to channel a portion of the air directed from said impingement baffle for film cooling of said heat shield, said heat shield comprising a radially outer edge and a radially inner edge; and at least one seal adjacent said heat shield and extending radially outwardly from said heat shield outer edge to the dome plate.

8. A dome assembly in accordance with claim 7 wherein said seal extends circumferentially between said heat shield and said dome plate, said seal configured to prevent air from flowing between said heat shield and said dome plate.

9. A dome assembly in accordance with claim 7 wherein said heat shield comprises a plurality of openings extending therethrough.

10. A dome assembly in accordance with claim 7 wherein said impingement baffle comprises a plurality of openings extending therethrough, said impingement baffle openings in flow communication with said heat shield.

11. A dome assembly in accordance with claim 10 wherein said heat shield comprises a plurality of openings extending therethrough, said heat shield and said dome plate define a cavity, said impingement baffle openings in flow communication with said cavity.

12. A dome assembly in accordance with claim 11 wherein said heat shield openings in flow communication with said impingement baffle openings and said dome plate cavity.

13. A dome assembly in accordance with claim 7 wherein said heat shield configured to direct air for film cooling of said heat shield.

14. A combustor for a gas turbine engine, said combustor comprising a dome assembly comprising a dome plate and a heat shield coupled to said dome plate, and at least one seal extending at least partially therebetween, said dome plate comprising an impingement baffle and a fuel injector opening extending therethrough, said impingement baffle configured to direct air for impingement cooling, said heat shield configured to channel a portion of the air directed from said impingement baffle for film cooling of said heat shield, said heat shield comprising a radially outer edge and a radially inner edge, said at least one seal extending radially outwardly from said heat shield outer edge to the dome plate.

15. A combustor in accordance with claim 14 wherein said dome assembly heat shield extends through said dome plate opening, said dome plate impingement baffle further configured to direct air for film cooling of said heat shield.

16. A combustor in accordance with claim 15 wherein said dome assembly heat shield comprises a plurality of openings extending therethrough.

17. A combustor in accordance with claim 15 wherein said dome assembly dome plate impingement baffle comprises a plurality of openings extending therethrough for directing airflow towards said heat shield.

18. A combustor in accordance with claim 17 wherein said dome assembly heat shield and said impingement baffle define a cavity, said dome impingement baffle openings in flow communication with said cavity.

19. A combustor in accordance with claim 18 wherein said dome assembly heat shield comprises a plurality of openings extending therethrough, said impingement baffle openings in flow communication with said heat shield openings.

20. A combustor in accordance with claim 15 wherein said dome assembly seal extends circumferentially between said heat shield and said dome plate.

* * * * *